(12) United States Patent
Thomson et al.

(10) Patent No.: US 9,854,095 B2
(45) Date of Patent: Dec. 26, 2017

(54) AGENT STATISTICS BY LOCATION

(71) Applicant: Avaya Inc., Basking Ridge, NJ (US)

(72) Inventors: Rodney A. Thomson, Westminster, CO (US); Brian J. Reynolds, Firestone, CO (US); Katherine A. Sobus, Wilmington, DE (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/840,613

(22) Filed: Mar. 15, 2013

(65) Prior Publication Data

US 2014/0270134 A1    Sep. 18, 2014

(51) Int. Cl.
*H04M 3/00* (2006.01)
*H04M 3/51* (2006.01)

(52) U.S. Cl.
CPC .... *H04M 3/5175* (2013.01); *H04M 2203/401* (2013.01); *H04M 2203/556* (2013.01); *H04M 2242/30* (2013.01)

(58) Field of Classification Search
CPC ...... H04M 3/51; H04M 3/523; H04M 3/5175; H04M 3/5233; H04M 3/5232; H04M 3/5158
USPC ............................ 379/265.01–265.02, 265.12
See application file for complete search history.

(56) References Cited

U.S. PATENT DOCUMENTS

| | | | |
|---|---|---|---|
| 5,590,188 A * | 12/1996 | Crockett | H04Q 3/665 379/225 |
| 5,778,060 A * | 7/1998 | Otto | H04M 3/5125 379/265.04 |
| 6,134,530 A * | 10/2000 | Bunting et al. | 705/7.25 |
| 6,272,347 B1 * | 8/2001 | Griffith et al. | 455/445 |
| 6,711,253 B1 * | 3/2004 | Prabhaker | 379/265.01 |
| 2005/0047579 A1 * | 3/2005 | Salame | H04L 29/06027 379/265.09 |
| 2005/0091071 A1 * | 4/2005 | Lee | G06Q 10/06398 379/265.03 |
| 2005/0195960 A1 * | 9/2005 | Shaffer et al. | 379/265.02 |
| 2006/0203991 A1 * | 9/2006 | Kramer | H04M 3/5175 379/265.06 |
| 2008/0192908 A1 * | 8/2008 | O'Keefe et al. | 379/93.17 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |
| 2016/0021250 A1 * | 1/2016 | Kumar | H04M 3/5232 379/88.01 |

* cited by examiner

*Primary Examiner* — Rasha Al Aubaidi
(74) *Attorney, Agent, or Firm* — Sheridan Ross P.C.

(57) ABSTRACT

The present disclosure is directed to methods including obtaining a location data of a source; obtaining at least one performance measure; correlating the location data and the at least one performance measure to obtain a correlation; and analyzing the correlation to obtain an analysis report. The present disclosure is further directed to systems that include a source related to a contact center, and a processor configured to: obtain a location data of the source; derive at least one performance measure; correlate the location data and the at least one performance measure to obtain a correlation; and analyze the correlation to obtain an analysis report.

18 Claims, 4 Drawing Sheets

AGENT STATISTICS BY LOCATION

FIELD OF THE DISCLOSURE

The present disclosure is generally directed toward communications and more specifically toward contact centers.

BACKGROUND

Contact centers can provide numerous services to customers, and have been doing so for years. The idea of a contact center queue is not much different from that of standing in line at a bank and waiting to be helped by the next available teller. However, there can be a lot of frustration if the first, second, or even third teller cannot answer a given question or set of questions. The same frustrations have been known to occur in contact centers. A company can gain customer satisfaction if they are able to answer their customers' questions quickly and accurately.

Contact centers (also referred to as call centers), such as Automatic Call Distribution (ACD) systems, are employed by many enterprises to service customer contacts (also referred to as calls or customers). A typical contact center includes a switch and/or server to receive and route incoming packet-switched and/or circuit-switched contacts and one or more resources, such as human agents and automated resources (e.g., Interactive Voice Response (IVR) units), to service the incoming contacts.

As products and problems become more complex and diverse in nature, a single agent often no longer has all of the skills or expertise to fully service customer contacts. To service customer contacts more effectively, the contact center may route contacts to one or more resources with specific skills and attributes. For example, contact centers that handle computer customer service may have application resources, hardware resources, operating system resources, network resources, etc. While these resources may be well-qualified to answer questions on their particular subject(s), they are often unqualified to answer questions involving subjects outside of their respective skill sets.

Currently, resources may be assigned work, or vice versa, based on a number of factors that are considered by a selection mechanism. These factors may include, but are not limited to resource availability, agent training and/or skill, contact center state, contact type, and more. A specific selection mechanism may be applied to route work items based on, agent selection, queue selection, attribute selection or other desired mechanism. It is one goal of a contact center to maintain good customer service when handling contacts, and as such, many mechanisms have been developed to best distribute work to qualified agents in a timely and efficient manner. However, the work assignment mechanism of a contact center may not consider the most relevant data.

SUMMARY

For example, work assignment mechanisms may not consider location information. Location information (also referred to as location data) is information that identifies a point or an area and includes, but is not limited to, the absolute location or relative location related to a source or properties of a source. Sources may include a customer, a resource, an agent, a contact center, a queue, or a skill to which the communication is routed, among others. Resources may include completely automated resources, human resources utilizing communication devices, or contact centers, among others. It may be problematic for work assignment mechanisms to not consider the location information related to sources because analyzing call center data using location information may advantageously improve the performance of the call center.

Location information may improve the performance of the call center for various reasons. For example, people from certain geographical areas may have difficulty understanding their native language when it is spoken with (or without) a certain accent. Thus, customer satisfaction may be improved by considering statistics that consider the location information related to customers or resources. Further, call centers in certain locations may have difficulty in meeting performance goals, as such, an underperforming location may not be recognized. Still further, the detection of undesirable measurements of source attributes may be improved when attribute data is presented in a map format showing locations. Yet further, errors in call center systems may be more readily detectable using location information, or responses to changing conditions may be improved using location information. Thus, location information for agents may be important to improving call center operations, including call center performance and efficiency.

It is with respect to the above issues and other problems that the embodiments presented herein were contemplated.

The present disclosure is directed to methods including obtaining a location data of a source; deriving at least one performance measure; correlating the location data and the at least one performance measure to obtain a correlation; and analyzing the correlation to obtain an analysis report. The present disclosure is further directed to systems that include a source related to a contact center, and a processor configured to: obtain a location data of the source; obtain at least one performance measure; correlate the location data and the at least one performance measure to obtain a correlation; and analyze the correlation to obtain an analysis report.

It should be appreciated that the present disclosure outlines utilizing multiple selection mechanisms together to assign work items on a system-wide improved basis. By merging selection mechanisms, a work item may be assigned according to the improved solution for the work item, which may be a suboptimal solution for a given contact center. Among other things, the present disclosure provides methods, devices, and systems to overcome the limitations of current contact centers that cannot merge selection mechanisms in assigning work items inside and/or outside of a contact center.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
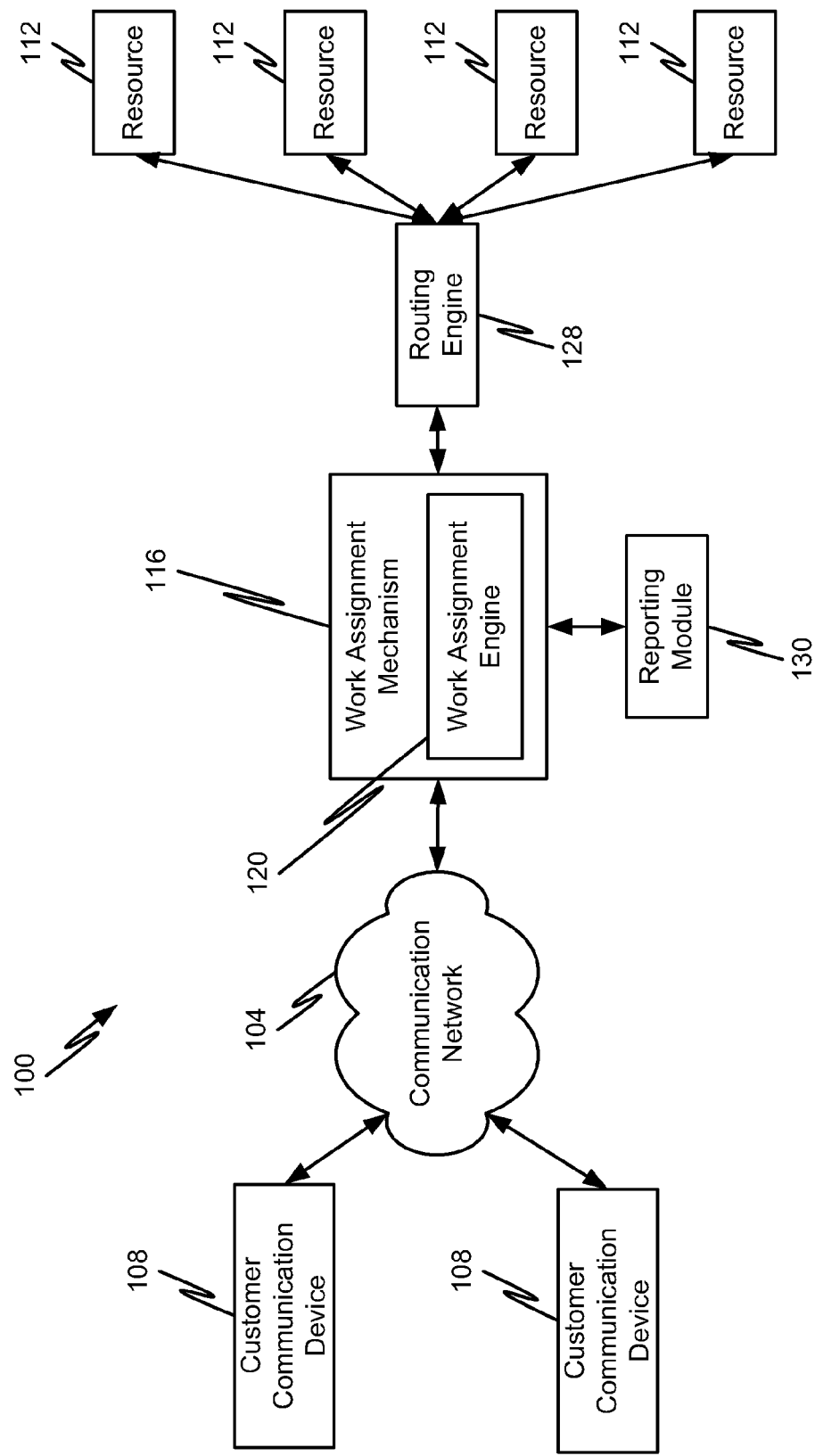
FIG. 1 is a block diagram of a communication system in accordance with some embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which is connected to a reporting module 130. The work assignment mechanism 116 may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which are hereby incorporated herein by reference in their entirety.

The format of the work item may depend upon the capabilities of the communication device 108 and the format of the communication. In some embodiments, work items are logical representations within a contact center of work to be performed in connection with servicing a communication received at the contact center (and more specifically the work assignment mechanism 116).

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 128. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers, and may include contact centers. Location information may be used to process resources 112, as described herein.

The work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 and/or work assignment engine 120 have capabilities that enable them to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is eligible and/or qualified to receive a work item and further determine which of the plurality of processing resources 112 is best suited to handle the processing needs of the work item. In situations of work item surplus, the work assignment engine 120 can also make the opposite determination (i.e., determine improved assignment of a work item to a resource). In some embodiments, the work assignment engine 120 is configured to achieve true one-to-one matching.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In addition, the work assignment mechanism 116 and/or the work assignment engine 120 may use location information to assign work items. As discussed above, the location information may be related to various sources. The work assignment mechanism 116 and/or the work assignment engine 120 may be configured to receive and assign work items based at least partially on location information, as described herein. In some embodiments, the work assignment mechanism 116 and/or the work assignment engine 120 may assign work items to one or more resources 112 based on an improved solution determined for the work item and/or contact center.

For example, the work assignment mechanism 116 and/or the work assignment engine 120 may apply various algorithms to a received work item in determining a work assignment. In various embodiments, a received work item may be subjected to a determination of location information and the location information may be used to determine the work item's assignment. In some embodiments, a received work item may have location information determined for sources related to the work item (e.g., resource locations and customer location, among others). Each assignment applied to a work item and taking into account location information may also be configured to utilize resource information received from one or more resources 112, and other information. Additionally, the work assignment mechanism 116 and/or the work assignment engine 120 may refer to various rules in determining a work assignment. As can be appreciated, the comparison of results related to resources 112, and/or contact center, or site, may be subject to stored rules. It is anticipated that these stored rules may determine conflict resolution, priority, wait time arrangement, and the like. Once an appropriate work assignment is determined by the work assignment mechanism 116 and/or the work assignment engine 120, the routing engine may route the work item to the determined resource 112. As can be appreciated, routing provided by the routing engine 128 may be affected by direction provided by at least one of the work assignment mechanism 116 and the work assignment engine 120. This direction may include input relative to resource 112 type, group type, customer identification, and the like.

In some embodiments, the work assignment mechanism 116 and/or the work assignment engine 120 may determine that an improved work assignment of a work item is to route the work item from a first contact center to another contact center. In some instances, the work item may be routed to a contact center outside of the first contact center's enterprise. This type of routing is at least one example of outsourcing. Whether the work item is outsourced (inside or outside of an existing enterprise) the work assignment mechanism 116 and/or the work assignment engine 120 may determine that the work item should be managed by another work assignment mechanism related to the outsourced resource 112.

As can be appreciated, the work assignment mechanism 116 and/or the work assignment engine 120 may add information to a work item to indicate a number of work assignment related data. This data may be maintained in a bitmap, table, or other digital form of memory that is associated with the work item. The data may include, but is not limited to, location information, selection mechanisms used in work assignment processing, further processing required (including work assignment, routing, etc), time in work assignment (e.g., cumulative time or per work assignment mechanism 116 time), source resource, destination resource, and other work assignment related information.

Additionally, data may be reported using the reporting module 130, which is in communication with the work assignment mechanism 116. The data may be reported in any format, including formats that display the differences in location related to the data, such as on a map or globe. The data may be reported in any sequence. For example, it may be reported at various stages of assigning work items, or determining location information. The contact center may adjust its behavior based on the data reported by reporting module 130. The data may be analyzed, and the analyzed data may be presented and/or reported in various formats. The data may be analyzed to determine underperforming or over-performing resources. The data analysis may be presented and used in various ways. It may be monitored for possible future use. It may be used to make managerial decisions about staffing. It may be used to find well performing agents, queues, or contact centers, and determine what attributes may be enabling the agents, queues, or contact centers to outperform those at other locations, for example. The data reported by reporting module 130 may be data that includes correlations between location data and performance measures, as described herein.

Figure 2:
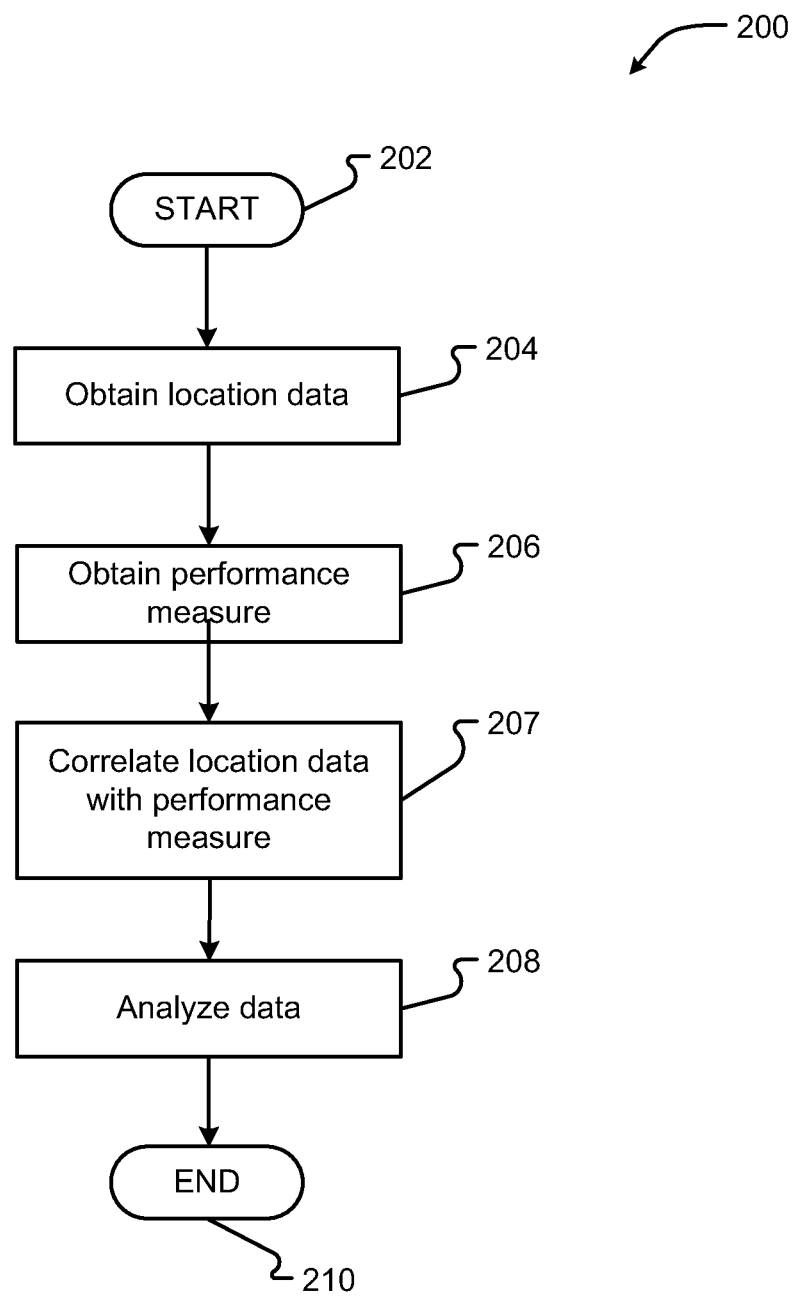
FIG. 2 is a flow diagram depicting methods in accordance with some embodiments of the present disclosure.

Referring now to FIG. 2, a flow diagram 200 depicting methods in accordance with embodiments of the present disclosure will be described. FIG. 2 starts at step 202. In step 202, location data is obtained. Location data may be obtained for various sources. For example, location data may be related to the customer only, or resources only, or both the customer and resources, or other attributes of sources. For example, location data may include information about a customer's home location, although the call center is receiving a call from the customer while the customer is away from home travelling. Also, location data may include the location information of a call center which outsourced a call to an agent in a remote location, as well as the location information related to the agent.

In step 206, a performance measure is obtained. The performance measure may be related to statistical data for sources and/or resources. For example, a performance measure may be a performance related to a specific queue or skill (such as measures related to average wait time, average handle time, abandoned calls, cancelled calls, and busy signals, among others), or agent data (such as measures related to agent activity, e.g., states or events).

Location data and performance measure may be obtained in any sequence. For example, they may be obtained simultaneously, or location data may be obtained prior to a performance measure and additional location data may be obtained after obtaining the performance measure or vice versa.

In step 207, the location data is correlated with the one or more performance measures. For example, the location data may be related to any of the performance measures to provide a statistical relationship between the two. Thus, in illustrative embodiments, the correlation may provide or indicate a predictive or statistical relationship using the location data and the performance measures. Such a correlation may occur when there is any departure of the location data and performance measures from being variables that are dependent from each other, or the correlation may occur when there is any type of relationship between the location data and the performance measures, including any type of specialized relationship. The correlation can have varying degrees of correlation, which may denote various relationships between the location data and the performance measures. The correlation may provide various correlation data, such as correlation coefficients, that may vary in sensitivity.

In step 208, the data is analyzed. The data analysis may take into account some or all of the location data and some or all of the performance measures, including the correlation between any of them. The data analysis may analyze the correlation between the location data and the performance measures, as well as the location data and the performance measures themselves. Further, the data analysis may indicate that a causal relationship exists between the location data and the performance measures, or it may indicate an identity relation (e.g., tautology that is a compound propositional form, all of whose instances are true, or an instance of such a form), with no causal relationship.

For example, the location data may be analyzed to sort the data by groups of agents (e.g., agents working for a specific manger, agents with specific skills, and agents working in a specific queue, among others), queues, and targets/goals, among others. Statistics for the sorted data may then be analyzed by any criteria (e.g., agents of a certain group may be compared among different locations, queue data may be compared among different locations, statistics by manager may be compared among different locations, etc.). In further embodiments, the data may be analyzed by looking at overall data, then looking at the same data by location to determine any locations having outlying data. Such a method may also determine if a certain group is compensating for another group, which may not be apparent without looking at the data per location. The analyzed data may be presented in an analysis report, which may be in any form, exemplary illustrations of which are described herein.

The data analysis may be presented and used in various ways. It may be monitored for possible future use. It may be used to make managerial decisions about staffing. It may be used to find well performing agents, queues, or contact centers, and determine what attributes may be enabling the agents, queues, or contact centers to outperform those at other locations (or conversely, such as to assist in identifying training opportunities). In some embodiments, the data may be presented on a map or other form of display for analysis. In various embodiments, real-time (or near real-time) data may be presented as well as historical data, and data shown on a map may be updated in real-time (or near real-time).

Figure 3:
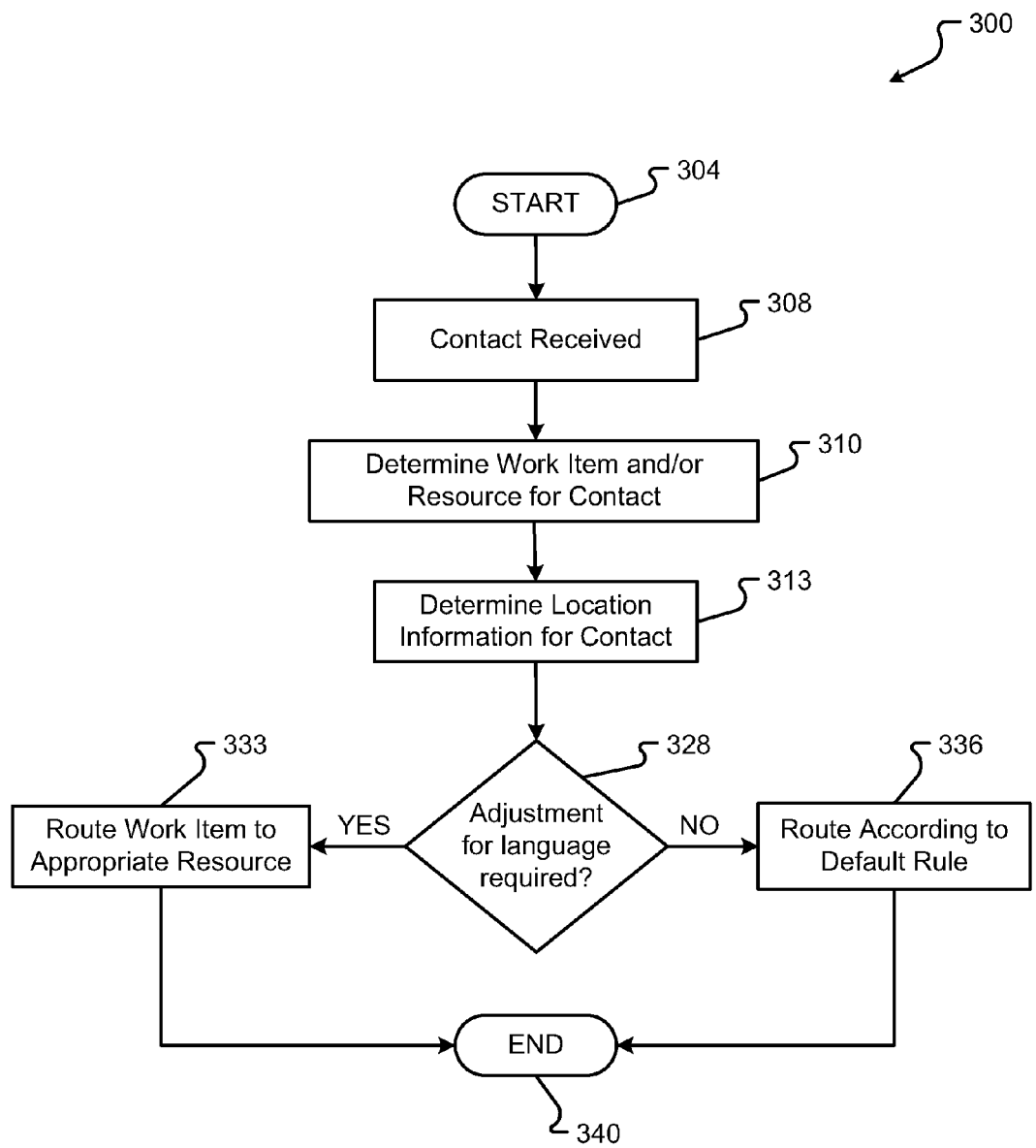
FIG. 3 is a flow diagram depicting methods in accordance with some embodiments of the present disclosure.

Referring now to FIG. 3, an illustrative flow diagram is provided in accordance with some embodiments of the present disclosure depicting a method 300 of assigning work items using location information. The method 300 begins at step 304 and proceeds when a contact is received by the work assignment mechanism 116 of a contact center (step 308). Next, a work item for the contact may be determined in step 310. This analysis may be performed by the work assignment mechanism 116, through its various components (e.g., the work assignment engine 120). For example, the work item may be determined by analysis of various information, including, for example, an identifier, associated skills and attributes, assigned resources 112, and the like. In embodiments, the method 300 may determine the work item by determining whether any rules should be applied to the work item. For example, rules may direct the contact center to route the work item to a specific resource 112. Another embodiment may direct the contact center to process the work item as a regular work item.

Further, in illustrative embodiments, each received contact may be analyzed for pertinent information to aid in routing (including queuing) of the work item. Among other things, the work item may be created to include routing and/or attribute information that can be used when routing the work item. As can be appreciated, the analysis may include the consideration of any number of mechanisms to route, queue, and/or direct the work item to one or more resources 112.

In step 313, location information for the contact may be determined. This analysis may be performed by the work assignment mechanism 116, through its various components (e.g., the work assignment engine 120). Categories of location information relating to the contact may include, but is not limited to, home location, work location, and current location, among others. In some embodiments, determining location information may be based on presence information. The presence information may relate to the presence of the contact, including, but not limited to a home computer, a work computer, a mobile device, and combinations thereof. Presence may be provided via multiple methods and/or standards including but not limited to Session Initiation Protocol ("SIP"), Instant Message and Presence Protocol ("IMPP"), Extensible Messaging and Presence Protocol ("XMPP"), and the like. In further embodiments, the location information may be obtained via a lightweight directory access protocol (LDAP) or director information (e.g., a corporate directory).

In accordance with various embodiments of the present disclosure, it is anticipated that the categories of location information related to a contact may be provided via manual input, automated processes including automated discovery, and/or combinations thereof. In some embodiments, the manual input may be provided by a customer who is requesting a resource. This manual input may be provided in response to one or more human agent and automated resource (e.g., IVR) prompts. Additionally or alternatively, the work assignment mechanism 116, upon receiving a contact, may automatically determine the location of the contact based on information associated with devices the contact uses. This data may be used to further determine related calls, historical data, customer quality levels, languages, geographic resources, and the like.

In various embodiments, other location information may be obtained and used. For example, methods of the disclosure may determine applicable queues and/or skills or resources, including individual resources, required by the contact. In embodiments, this may be done in conjunction with creating a work item based at least partially on the work item analysis performed (e.g., step 310), or other steps in the method 300, including any correlation between the location information and the contact and/or work item information, for example. Thus, in various embodiments, the determination of applicable queues and/or skills may take into account the location information for the contact (e.g., from step 313) and any correlation between the data. And resources (e.g., resources 112) to which the work item was directed (e.g., based on step 310) may be adjusted, when considering the location information of the contact. For example, it may be known that people residing in the United States often have a problem with a specific feature of the application that the work item is related to. Thus, methods may consider such information when determining applicable queues and/or skills, and agents having the skill of being experienced with the specific feature may be selected for the work item.

In addition, location information may be determined for the queues and/or skills or resources, including individual resources. Such location information may also be correlated with other information received, and this may further alter the routing of the work item. For example, after determining that the contact resides in the United States, and is calling from Colorado, methods may determine that applicable queues and/or skills related to the work item exist at contact centers located in the United States as well as in Japan. When determining the applicable queues and/or skills, methods may account for the language and accents associated with each available contact center, and thereby determine that the work item should be routed to the contact center in the United States. Although this example relates to queues, various embodiments disclosed herein relate to other types of contact centers, including queue-less contact centers and performing work assignments using attribute sets.

The method 300 continues by determining whether any other adjustment for language is required (step 328). In embodiments, the previous adjustments to the routing of the work item may not have occurred, and any adjustments based on the location information of the contact and the queues and/or skills may be delayed until step 328. If no improved routing is determined based on the language information, the method will route the work item according to a predetermined, or default, rule (step 336). For example, customers may desire to distribute call volume across internal and outsourced agents, and/or between outsource vendors. Thus, Vendor A may get 30% of calls, Vendor B may get 20% of calls, and internal agents may get 50% of calls. A default rule may consider the current distribution of contacts across contact centers in determining who should get the contact. Another example of a default rule may include routing to an internal (inside an enterprise) resource 112 before routing to an external (outsourced) resource 112. However, in the event that an improved routing is determined based on language information, the work item is routed according to the at least one improved resource 112 (step 333). It is anticipated that the routing may be performed by the routing engine 128 in response to direction provided by at least one of the work assignment mechanism and work assignment engine 120.

Figure 4:
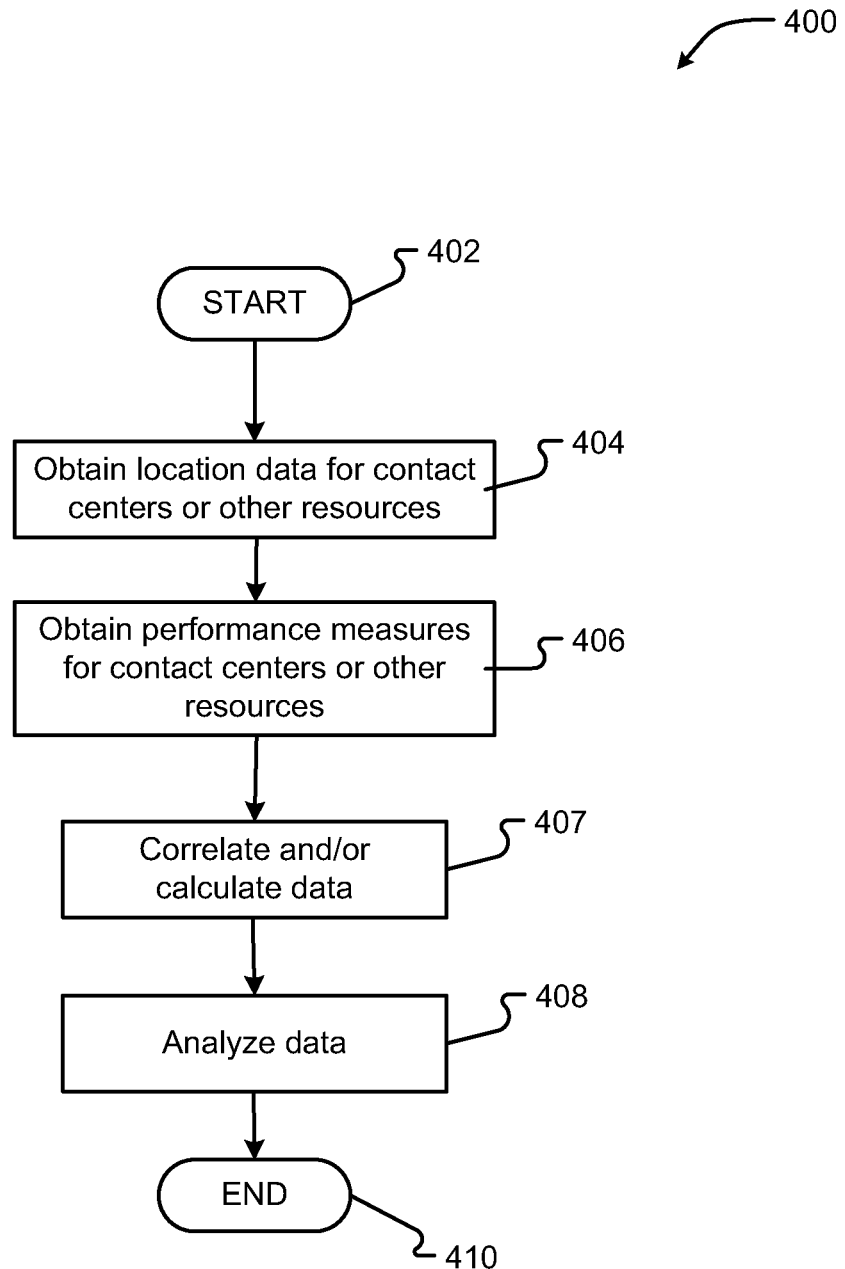
FIG. 4 is a flow diagram depicting methods in accordance with some embodiments of the present disclosure.

FIG. 4 is a flow diagram depicting a method 400 of analyzing location data for contact centers in accordance with embodiments of the present disclosure. FIG. 4 starts at step 402. In step 404, location data is obtained for multiple contact centers. Location data may be related to various attributes of each call center. For example, location data may include the location information of a call center which outsources call to agents in remote locations, as well as the location information related to calls that are not outsourced. In addition, location data may be separated for times when the call center was handling calls transferred to it by another call center location.

In step 406, performance measures for the contact centers are obtained. The performance measure may be related to any statistical data regarding the contact center. For example, the performance measures may be statistical information related to a specific queue and/or skill (such as measures related to abandoned calls, cancelled calls, and busy signals, among others), or agent data (such as measures related to agent activity, e.g., states or events, including but not limited to service level, occupancy and/or performance)) related to the contact center. Additional examples of performance measures include any type of Key Performance Indicator (KPI) monitored and/or tracked in a contact center. Non-limiting examples of contact center KPIs include occupancy or service level (e.g., expressed as a percentage—this helps identify how much time an agent is actually "speaking live" to your customers. As a rule, the higher the percentage, the better), abandoned calls, percentage abandoned, calls answered, calls offered, Average Wait Time (AWT), grade of service (e.g., number of calls answered within x seconds or Average Handle Time (AHT)), conversion, average call length, first call resolution (as a percentage), customer call frequency, average age of query, combinations thereof (e.g., net promoter score (NPS)), and the like.

Location data and performance measure may be obtained in any sequence. For example, they may be obtained simultaneously, or location data may be obtained prior to a performance measure and additional location data may be obtained after obtaining the performance measure or vice versa.

In step 407, the location data and performance measure are correlation. Such a correlation may occur as described herein. In step 408, the data is analyzed. The analyzed data may be presented in a format displaying the differences in location, such as on a map or globe. The data may be analyzed to determine underperforming or over-performing call centers. Various factors may be taken into consideration regarding the call center; for example, data that occurred during the time of a natural disaster in a specific location, which caused an unusually high volume of calls or low staffing numbers, may be ignored in the analysis.

The data analysis may be presented and used in various ways. It may be monitored for possible future use. It may be used to make managerial decisions about staffing. It may be used to find well performing agents, queues, or contact centers, and determine what attributes may be enabling the agents, queues, or contact centers to outperform those at other locations.

In addition, illustrative embodiments described herein may be used to obtain predictive results; e.g., predictive results based on the data analysis. As an example, various locations may be analyzed to determine which location may be best to serve the customer based on a real-time variable to make a current (e.g., real-time or near real-time) decision or a future decision. Thus, if an outsourcer A has generated very poor results dealing with customers from region X in the most recent 15 minutes; such an issue may be considered when selecting a target agent pool. If an agent, a server, a resource, etc. is not available or will not be available, then the system may consider changing to another process (e.g., another way to handle the communication).

It should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture, including queue-less architectures.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   receiving, by a microprocessor in a work assignment server and via a communication network, same types of work items from communication devices;
   obtaining, by a microprocessor, location data of first and second contact centers in first and second different physical geographical areas, wherein the first and second contact centers are assigned the same types of work items;

obtaining, by the microprocessor and from the first and second contact centers, a performance measure related to the first and second contact centers in the first and second different physical geographical areas, wherein the performance measure is a performance of the first and second contact centers regarding the same types of work items received from a third different physical geographical area, wherein the performance measure determines, in real-time, whether one of the first and second contact centers in the first and second different physical geographical areas has generated a poor performance result dealing with customers from the third different physical geographical area in a specific time period;

after obtaining the location data and the performance measure, correlating, by the microprocessor, the location data with the performance measure to obtain a correlation associating the performance measure with the first and second different physical geographical areas of the first and second contact centers;

analyzing, by the microprocessor, the correlation to compare performance measures for the first and second contact centers in the first and second different physical geographical areas regarding the same types of work items;

receiving, by the microprocessor, a new work item of the same type;

assigning, by the microprocessor, the new work item of the same type to a selected one of the first or second contact center based on the analysis; and routing, by the microprocessor and via the communication network, the assigned new work item to the selected one of the first or second contact center based on the analyzed correlation.

2. The method of claim 1, further comprising obtaining additional location data for an additional contact center in a different physical geographical area.

3. The method of claim 1, wherein the first and second contact centers comprises skills of the contact center resources with subsets of the skills comprising different location data, and the new work item is in response to a customer request.

4. The method of claim 1, wherein the analysis provides a predictive improved result based on the correlation, and further comprising basing the assignment of the new work item on the predictive improved result from the analysis.

5. The method of claim 4, wherein the predictive improved result is an improved work assignment route of the new work item.

6. The method of claim 5, wherein the obtaining the location data comprises obtaining a current location of the first and second contact centers by automated discovery of a presence location.

7. The method of claim 1, wherein the analysis contains an improved result that is an improved contact center performance compared with a previous result from the first and second contact centers, and the assigning of the work item is based on the improved contact center performance.

8. The method of claim 1, further comprising obtaining additional location data for an additional contact center, and the analysis identifies that one of the first contact center, the second contact center, or the additional contact center are overcompensating.

9. A system, comprising:
a microprocessor; and
a work assignment engine in a server comprising instructions executed by the microprocessor to:

receive, via a communication network, same types of work items from communication devices;

obtain location data of first and second contact centers in first and second different physical geographical areas, wherein the first and second contact centers are assigned the same types of work items;

obtain, from the first and second contact centers, a performance measure related to the first and second contact centers in the first and second different physical geographical areas, wherein the performance measure is a performance of the first and second contact centers regarding the same types of work items received from a third different physical geographical area, wherein the performance measure determines, in real-time, whether one of the first and second contact centers in the first and second different physical geographical areas has generated a poor performance result dealing with customers from the third different physical geographical area in a specific time period;

after obtaining the location data and deriving the performance measure, correlate the location data with the performance measure to obtain a correlation associating the performance measure with the first and second different physical geographical areas of the first and second contact centers;

analyze the correlation to compare performance measures for first and second contact centers in the first and second different physical geographical areas regarding the same types of work items; and receive a new work item of the same type;

assign the new work item of the same type to a selected one of the first or second contact center based on the analysis; and routing, by the microprocessor and via the communication network, the assigned new work item to the selected one of the first or second contact center based on the analyzed correlation.

10. A system, comprising:
a first and second contact center in first and second different physical geographical areas;
a work assignment server;
a microprocessor executable work assignment engine in the work assignment server that, when executed by a microprocessor makes work assignment decisions for work items, and
the microprocessor that:

receives, via a communication network, same types of work items from communication devices;

obtains location data of the first and second contact centers in the first and second different physical geographical areas, and wherein the first and second contact centers are assigned the same types of work items;

obtains, from the first and second contact centers, a performance measure related to the first and second contact centers in the first and second different physical geographical areas, wherein the performance measure is a performance of the first and second contact centers regarding the same types of work items received from a third different physical geographical area, wherein the performance measure determines, in real-time, whether one of the first and second contact centers in the first and second different physical geographical areas has generated a poor performance result dealing with customers from the third different physical geographical area in a specific time period;

after obtaining the location data and deriving the performance measure, correlates the location data with the performance measure to obtain a correlation associating the performance measure with the first and second different physical geographical areas of the first and second contact centers;

analyzes the correlation to compare performance measures for the first and second contact centers in the first and second different physical geographical areas regarding the same types of work items;

wherein one of the work items of the same type is assigned based on the analysis to a selected one of the first or the second contact center; and routes the one of the work items to the selected one of the first or second contact centers based on the analyzed correlation.

11. The system of claim 10, wherein the microprocessor tracks events related to processing of the work items prior to the work items reaching an agent of the contact center.

12. The system of claim 11, wherein the performance measures comprise performance measure data points, the correlation comprises the performance measure data points at distinct physical locations and the analysis shows health indicators of the distinct physical locations.

13. The system of claim 11, wherein an operation of the first and second contact centers is performed for all agents in the first and second contact center, and wherein the analysis identifies an underperformance of one of the first or the second contact center.

14. The system of claim 10, wherein the performance measures comprise performance measure data points for distinct physical locations in the first and second contact centers.

15. The system of claim 14, further comprising selecting an improved result from the analysis, wherein the improved result is obtained by comparing analysis of the location data for the distinct physical locations.

16. The system of claim 10, wherein the performance measures comprise performance measure data points, the correlation comprises the performance measure data points for distinct physical locations, the analysis shows health indicators of the distinct physical locations based on the performance measure for queues of the first and second contact centers, and the analysis provides a predictive result that alters an assignment of a future work item received in the first and second contact centers after the analysis.

17. The system of claim 10, wherein the performance measures comprise performance measure data points, the correlation comprises the performance measure data points for distinct physical locations and the analysis shows health indicators of the distinct physical locations based on the performance measure for customers.

18. The system of claim 17, wherein the analysis provides the health indicators of the distinct physical locations on a map such that the distinct physical locations are shown in relation to varying geographic areas.

* * * * *